(12) United States Patent
Bowman

(10) Patent No.: US 7,655,053 B1
(45) Date of Patent: Feb. 2, 2010

(54) PROCESS FOR SODIUM CARBONATE CRYSTALS FROM SOLUTIONS

(76) Inventor: Ronald W. Bowman, 5574-B Everglades St., Ventura, CA (US) 93003

( * ) Notice: Subject to any disclaimer, the term of this patent is extended or adjusted under 35 U.S.C. 154(b) by 419 days.

(21) Appl. No.: 11/530,097

(22) Filed: Sep. 8, 2006

(51) Int. Cl.
*C01D 7/24* (2006.01)

(52) U.S. Cl. ........................ 23/302 T; 423/421

(58) Field of Classification Search ............... 423/302, 423/421; 23/302 T
See application file for complete search history.

(56) References Cited

U.S. PATENT DOCUMENTS

| | | | |
|---|---|---|---|
| 3,119,655 A | 1/1964 | Frint et al. | |
| 3,260,567 A | 7/1966 | Hellmers et al. | |
| 3,361,540 A | 1/1968 | Peverly et al. | |
| 3,479,133 A | 11/1969 | Warzel | |
| 4,584,077 A | 4/1986 | Chlanda et al. | |
| 5,043,149 A | 8/1991 | Frint et al. | |
| 6,022,385 A | 2/2000 | Bowman | |
| 6,514,475 B1 * | 2/2003 | Oosterhof et al. | ........... 423/421 |

* cited by examiner

*Primary Examiner*—Edward M Johnson
(74) *Attorney, Agent, or Firm*—Egbert Law Offices PLLC

(57) ABSTRACT

A method of producing sodium carbonate from any solution or carbonate mineral, especially trona, that includes: removing calcium and magnesium compounds from an input solution; passing the input solution to a precipitator, adding methanol of 30% to 70% by volume to the solution in the precipitator so as to precipitate carbonate from the solution, washing the precipitated carbonate with a methanol-containing solution, and drying the washed precipitated crystals at low temperatures. The present invention provides a refined technique for reducing impurities and increasing efficiency of the process whereby sodium carbonate crystals can be formed of various sizes, shapes, densities and distributions by adjusting various parameters of the process. The sodium carbonate crystals produced from the process may originate from an input solution comprised of calcined-sodium carbonate solution, tailing pond water, waste pond water, sesquicarbonate or uncalcined trona solution, or from various mixtures of carbonates and bicarbonates.

17 Claims, 3 Drawing Sheets

PROCESS FOR SODIUM CARBONATE CRYSTALS FROM SOLUTIONS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to processes for manufacturing sodium carbonate and sodium bicarbonate crystals. More particularly, the present invention relates to methods and apparatus for forming sodium carbonate crystals of a desired size, shape and density.

2. Description of Related Art Including Information Disclosed Under 37 CFR 1.97 and 37 CFR 1.98

Much of the world's production of soda ash is produced from natural trona deposits. Natural trona ore is a hydrated mixture of sodium carbonate and sodium bicarbonate along with various organic and inorganic impurities. Currently, soda ash is produced from trona by one of two processes (1) the monohydrate process or (2) the sesquicarbonate process.

In the monohydrate process, trona ore is first calcined in a rotary kiln at temperatures of 175 to 200° C./347 to 397° F. This serves to convert bicarbonate to carbonate. Calcining operations at temperatures between 350 to 400° C. also destroy organic impurities present in the ore. Inorganic contaminants are removed from the calcined trona by dissolving the material in water and recrystallizing sodium carbonate from the filtered solution through the use of heat applied to the water. Soluble inorganic impurities, such as sodium carbonate and sodium sulfate, remain in the mother liquor. Insoluble impurities, such as shale and calcium carbonate, are removed by filtration prior to crystallization. The resulting sodium carbonate crystals, in the monohydrate form, are separated by filtration or centrifugation. The monohydrate crystals are then dried and calcined to anhydrous sodium carbonate. The sesquicarbonate process utilizes basically the same unit operations as the monohydrate process. However, the arrangement of these unit operations differs.

In the sesquicarbonate process, trona ore is first dissolved in hot water and the resulting solution filtered to remove insoluble impurities. Organic impurities are then removed by adsorption of the organics on activated carbon. Pure trona (or sesquicarbonate) is then recrystallized from the purified solution by using triple-effect evaporators. A solution of sodium carbonate (to maintain in excess of 10 to 25% excess carbonate) is recycled in the evaporators so as to obtain the sesquicarbonate. Since trona is an incongruently dissolving double salt, sesquicarbonate cannot be formed by cooling. This, once again, leaves soluble inorganic impurities in the mother liquor. The sesquicarbonate crystals are then calcined to produce sodium carbonate.

These processes are described in detail in various U.S. patents. For example, U.S. Pat. No. 3,479,133, issued on Nov. 18, 1969, to F. M. Warzel describes the monohydrate process. U.S. Pat. No. 3,119,655, issued in January of 1964, to Frint et al. describes the sesquicarbonate process. Similarly, U.S. Pat. No. 3,260,567, issued on July of 1966, to Hellmers et al. and U.S. Pat. No. 3,361,540, issued on Jan. 2, 1968, to Peverly et al. teach these sesquicarbonate processes.

Both the monohydrate and sesquicarbonate processes produce sodium carbonate crystals having a density range of 0.95 to 1.25 g/cc. Some applications (those in which the sodium carbonate is to be used in solution form) prefer the use of lower density crystals or higher surface area crystals. U.S. Pat. No. 5,043,149, issued on Aug. 27, 1991, to Frint et al., and assigned to the FMC Corporation, describes a process for the manufacture of such low density soda ash crystals. Sodium carbonate crystals obtained from all of the above process will vary greatly in size distribution. A large variety of commercial products are produced by the above-described processes. Each of the sodium carbonate crystals formed by these various processes were analyzed for the purpose of showing the size distribution of the crystals. The attached Table I shows the size distribution and shape of the various commercial products:

TABLE I

| | Commercial Products | | | | | | |
|---|---|---|---|---|---|---|---|
| Solution ID | FMC 100 | FMC 160 | FMC 260 | RP Lite | RP Dense | General Chemical Synthetic | ITOCHU Chem Fine Synthetic |
| MeOH Feed rate | N/A | N/A | N/A | N/A | N/A | N/A | N/A |
| RP feed rate | N/A | N/A | N/A | N/A | N/A | N/A | N/A |
| MeOH feed rate | N/A | N/A | N/A | N/A | N/A | N/A | N/A |
| Initial soln. volume | N/A | N/A | N/A | N/A | N/A | N/A | N/A |
| RPM | | | | | | | |
| Location of addition | N/A | N/A | N/A | N/A | N/A | N/A | N/A |
| Crystal Density (lb/ft3) | 49.4 | 61.9 | 65.31 | 52 | 61.4 | 35 | 60.2 |
| Size Distribution (%) | | | | | | | |
| 1000 u | | | | | | | 0.2 |
| 850 u | 0 | 0 | 0 | 2.8 | 0.3 | 0 | 3.6 |
| 600 u | | | | 0.03 | | | 8.5 |
| 425 u | | | | 0.98 | | | 21.1 |

TABLE I-continued

Commercial Products

| Solution ID | FMC 100 | FMC 160 | FMC 260 | RP Lite | RP Dense | General Chemical Synthetic | ITOCHU Chem Fine Synthetic |
|---|---|---|---|---|---|---|---|
| 355 u | 15.5 | 10.1 | 11.38 | 28.5 | 54.7 | 4.1 | |
| 300 u | | | | | | | 23.3 |
| 250 u | 30.4 | 35.8 | 29.39 | 31.7 | 33.2 | 4.3 | |
| 213 u | | | | | | | 24.5 |
| 150 u | | | 29.48 | | | | 13.5 |
| 106 u | 46.4 | 49.2 | 17.21 | 32.8 | 31 | 35.2 | 3.1 |
| 75 u | | | 7.55 | | | 0.9 | |
| 63 u | 7.5 | 4.6 | 2.71 | 4.1 | 0.8 | 33.1 | |
| 45 u | | | | | | | 1 |
| <45 u | | | | | | | 0.3 |
| 38 u | 0.1 | 0.2 | | 0.1 | 0.3 | 14.5 | |
| <38 u | 0 | 0 | | 0 | 0 | 8.5 | |
| Screened | x | x | x | x | x | x | x |
| Not Screened | | | | | | | x |
| Detergency (%) | | | | | | | |
| Absorptivity (%) | 13.9 | 12.5 | | | | 25 | 17.8 |
| Sulfate (ppm) | 300 | 400 | 700 | 1000 | 3000 | 200 | 600 |
| TOC (ppm) | 56 | 2 | | | | 8 | |
| Crystal Morphology | Large rods | Small rods | Blocky | Mixed balls | Mixed balls | Small snowflakes | Small Balls |
| Date | May 26, 1995 | Jun. 28, 1995 | Sep. 1, 1995 | Jun. 28, 1995 | Jun. 28, 1995 | Jun. 28, 1995 | November 1995 |

The various sizes, shapes and distributions of crystals are applicable in various processes. For example, a large size distribution can adversely affect the dissolving rates of the sodium carbonate and also can produce undesirable dust (at less than about 60 microns). This poses a problem if the material is to be used in dry processes, such as glass manufacturing. In addition, a wide particle size distribution can cause serious problems in the filtration or centrifugation processes which are used to separate the crystals from the mother liquor. As such, it is desirable to form sodium carbonate crystals which have a size distribution, shape and density which mirrors that of commercial products while producing such products at a relatively low cost.

U.S. Pat. No. 4,584,077, issued on Apr. 22, 1986, to Chlanda et al. describes a process for recovering sodium carbonate from trona and other mixtures of sodium carbonate and sodium bicarbonate. This process includes the steps of: (1) forming an aqueous solution comprising sodium carbonate and sodium bicarbonate; (2) removing a portion of the sodium bicarbonate from the solution so as to form a mother liquor comprising sodium carbonate and a reduced amount of sodium bicarbonate; (3) subjecting the mother liquor to an electrodialytic water splitting by circulating the water liquor through an electrodialytic water splitter to produce a liquid reaction product comprising sodium carbonate substantially free of sodium bicarbonate; and (4) withdrawing the liquid reaction product comprising sodium carbonate substantially free of sodium bicarbonate from the electrodialytic water splitter. In this patent, it was described that the sodium carbonate solution product from the base compartment is fed to a primary absorber wherein a liquid loading substance is absorbed into the sodium carbonate solution. The "liquid loading substance" includes liquids such as ammonia, methanol, ethanol and the like. This is added to the sodium carbonate solution to cause the sodium carbonate to crystallize out as the decahydrate, monohydrate or mixtures thereof. As a reaction product, these can be readily separated from the crystallized sodium carbonate-containing material.

This Chlanda process is an extremely energy inefficient process for producing sodium carbonate from trona. A sodium carbonate solution is produced from an electrodialytic water splitter. Sodium bicarbonate is converted to sodium carbonate prior to reacting with the "liquid loading substance".

U.S. Pat. No. 6,022,385, issued on Feb. 8, 2000, to the present inventor teaches a method of producing sodium carbonate or bicarbonate from any solution or carbonate mineral, but especially from trona, that comprises the steps of: (1) passing a solution containing calcined trona, a solution of carbonate, or tailing pond water to a precipitator; (2) adding methanol of 30% to 70% by volume to the solution in the precipitator so as to precipitate carbonate from the solution, (3) washing the precipitated carbonate with an alcohol-containing solution, and (4) drying the washed precipitated crystals at low temperatures. Fundamentally, the process of the present invention provides a technique whereby sodium carbonate crystals can be formed of various sizes, shapes, densities and distributions by adjusting various parameters of the process. In particular, such sodium carbonate crystals can be produced from various inputs such as from a calcined-sodium carbonate solution, from tailing pond water, from sesquicarbonate or uncalcined trona, or from various mixtures of carbonates and bicarbonates.

Applications of the currently known processes for producing sodium carbonate crystals encounter problems when adjusting for the various types of sodium carbonate containing solutions. Such input solutions range from relatively pure bicarbonate solution, carbonate-bicarbonate solution, sesquicarbonate solution, calcined trona solution, uncalcined trona solution to tailing pond water. Each type of input solution contains various impurities and compounds which reduce the efficiency of the precipitation processes and affect the purity of the sodium carbonate crystals produced.

For example, when processing trona deposits from waste ponds and tailing ponds, the input solution from the ponds contain mostly carbonate and decahydrated carbonate with water impurities over 200,000 ppm and high levels of organics, hardness, silica and sulfates. In U.S. Pat. No. 6,022,385, issued on Feb. 8, 2000, to the present inventor, the amount of impurities may be minimized in sodium carbonate crystals by making large size crystals. The process disclosed in U.S. Pat. No. 6,022,385 also appears to convert the decahydrate carbonate to a lower hydrate and even to a monohydrate. Thus, when using the process of U.S. Pat. No. 6,022,385, additional heat to dehydrate the decahydrated carbonate is not required, unlike other disclosed processes.

Currently, the methods of precipitating sodium carbonate crystals from the various sources of sodium carbonate solutions requires finding means to reduce the amount of impurities from natural or less-refined sources. One method considered is to freeze the input solution in order to reduce the amount of impurities. For organic impurities, some methods include using organoclay to filter out organic impurities. For the hardness impurities, the removal involves steam stripping. For the silica impurities, alumina is used for the silica removal. Both the silica and hardness removal processes are disclosed in U.S. Pat. No. 6,022,385 to the present inventor. It is also known that hardness impurities may be removed by contacting with fresh water and the solid crystals in the precipitation process. These hardness impurities removed by this procedure include calcium and magnesium compounds. However, calcium and magnesium remain in the solution even after known means to attempt to purify the precipitated crystals.

It is an object of the present invention to provide a method for the manufacture of sodium carbonate or bicarbonate crystals that reduces scaling and impurity levels caused by hardness compounds, such as dolomite and trace shorite found in trona formations.

It is an object of the present invention to provide a method for the manufacture of sodium carbonate or bicarbonate crystals that reduces calcium and magnesium impurities from the input solution.

It is another object of the present invention to provide a method for the manufacture of sodium carbonate or bicarbonate crystals that washes excess methanol from the precipitated crystals so as to allow the use of direct fire dryers.

It is a further object of the present invention to provide a process that improves the overall heat balance.

It is still a further object of the present invention to provide a process for removing methanol from the precipitated crystals before drying.

These and other objects of the present invention will become apparent from a reading of the attached specification and appended claims.

BRIEF SUMMARY OF THE INVENTION

The present invention is a method of producing sodium carbonate or bicarbonate from any solution or carbonate mineral, but especially from trona, that comprises the steps of: (1) removing calcium and magnesium compounds from an input solution; (2) passing the input solution to a precipitator, (3) adding methanol of 30% to 70% by volume to the solution in the precipitator so as to precipitate carbonate from the solution, (4) washing the precipitated carbonate with a methanol-containing solution, and (5) drying the washed precipitated crystals at low temperatures. The present invention involves removing bulk water and methanol from the crystals before the step of drying. Fundamentally, the process of the present invention provides a refined technique for reducing impurities and increasing efficiency of the process whereby sodium carbonate crystals can be formed of various sizes, shapes, densities and distributions by adjusting various parameters of the process. In the present invention, the sodium carbonate crystals produced from the process may originate from an input solution comprised of calcined-sodium carbonate solution, tailing pond water, waste pond water, sesquicarbonate or uncalcined trona solution, or from various mixtures of carbonates and bicarbonates.

In the method of the present invention, an input solution from trona has high concentrations of dolomite, shorite, and other calcium compounds. With both the tailing pond water and calcined trona input solutions, X-ray analyses may indicate a high concentration of three compounds in the tailing pond water. These were sulfate, hardness compounds and silica from the tailing pond. Hardness was not a scaling problem in the methanol process, and an exact hardness purity level was never discovered. However, for those trona formations with high dolomite ($CaCO_3.MgCO_3$) concentration, it may be better to remove these calcium and magnesium-based impurities. The present invention uses methanol to concentrate these calcium and magnesium ions prior to reaching the methanol concentration level at which sodium carbonate begins to precipitate.

Most mines operate at about 50° C., 122° F., where the sodium carbonate solubility is about 477 g/1000 grams of water or 322 g/1000 grams saturated solubility. Most mines use about 300 g/1000 grams of sodium carbonate solution to go to the evaporators. About 15% volume methanol will initiate precipitation or exceed the saturation point of sodium carbonate, so the 15% by volume methanol would appear to concentrate the solution by about 37% to reach the 322 g/1000 grams of saturated solution (ignoring changes in volume of liter versus 1000 grams of saturated solution and decrease volume when adding methanol). Dolomite in the mined ore is about 5%. With a ratio of 1.65 for solution/ore the concentration in the solution is about 9%, assuming all dolomite goes into the solution. Thus, for 300 g/liter sodium carbonate concentration in an input solution, there would be approximately 30 g/liter dolomite.

To 300 g/l sodium carbonate, at 122° F., and 200, 1000, and 10,000 mg/liter of dolomite powder was added. Then a solution of 10% by volume methanol was added. The precipitate was about 98% dolomite and 2% calcite according to X-ray analyses. The removal was on average 90% of the dolomite added. Less than 1% sodium carbonate was precipitated in a few solutions, and this appeared to be due to cooling during filtration and would not be present in actual operations where the temperature would be maintained during filtration.

Therefore, most calcium and magnesium compounds should be precipitated from a solution of about 10% by volume methanol. Sodium carbonate from calcined trona did not precipitate until 15% by volume methanol. This result agrees with the solubility data for the dolomite and most other calcium and magnesium compounds reviewed. The data indicates less than 10% methanol could be added to concentrate most of the calcium and magnesium compounds at 122° F. 10% by volume was used to get maximum concentration and still be lower than the concentration required for sodium carbonate.

In the method of the present invention, the process also includes removal of excess methanol from the precipitated crystals prior to going to the dryer so that excess methanol would not be lost, and more efficient current direct fired dryers could be used.

It is known to take 15% by volume methanol density wast to precipitate a 300 g/l solution of sodium carbonate, so the excess methanol could be removed with the 300 g/l solution by washing the precipitated crystals as long as a 15% by volume methanol solution is not reached. The removal wash must be performed at less than 15% by volume to prevent further precipitation of crystals.

In the present invention, a vacuum filter was used to remove the bulk water and methanol after the density wash solution of 100% methanol. The density wash and the methanol removal wash were both performed at 0.2 gallons/pound of solids. Previous work had indicated a value from 0.15-0.2 gallons/pound of solids was required for the density wash. After the original precipitation of crystals by the density wash, the average methanol in the crystals was about 54,000 mg/1000 grams (about 17 gallons of methanol per ton of crystals). After the removal wash, the methanol in the crystals was below 20 mg/1000 grams. This removal wash on the crystals was performed on filter paper. With agitation in a large facility for the removal wash, the methanol in the crystals should be less than 5 mg/1000 grams. Therefore, a removal wash of the crystals should remove most of the remaining methanol on the crystals.

The removal wash may also be applied to precipitates of the calcium and magnesium compound. The simple mass and heat balance were made using precipitation of the dolomite and other calcium and magnesium impurities with a 90-100% methanol removal wash for lite density crystals and a 50-50% methanol removal wash for dense crystals. A triple effect distillation is used on the methanol for recycling. The precipitated dolomite and other impurities are also washed to remove excess methanol.

The removal of excess methanol allows for a more efficient heat balance to dry the crystals. It is indicated that about 1 mM Btu/ton of soda ash is required from steam latent heat at 366° F. for the distillation. However, about 1 mM Btu/ton of soda ash is available at 137° F. to condense part of the methanol. While the lower temperature heat is not the same entropy, the lesser heat can be used to heat the dissolving fluid for the calcined trona, to preheat the air to the dryer. Thus it has a use in the system and thus would appear to be a net cancellation of heat. The usual evaporators use 1 mM Btu/ton of soda ash. The condensed water from the steam for distillation was not used, but the water was left at that temperature so only the latent heat of evaporation had to be added. No thermal efficiencies were used in this simple heat balance for reusing the heat.

DETAILED DESCRIPTION OF THE INVENTION

Figure 1:
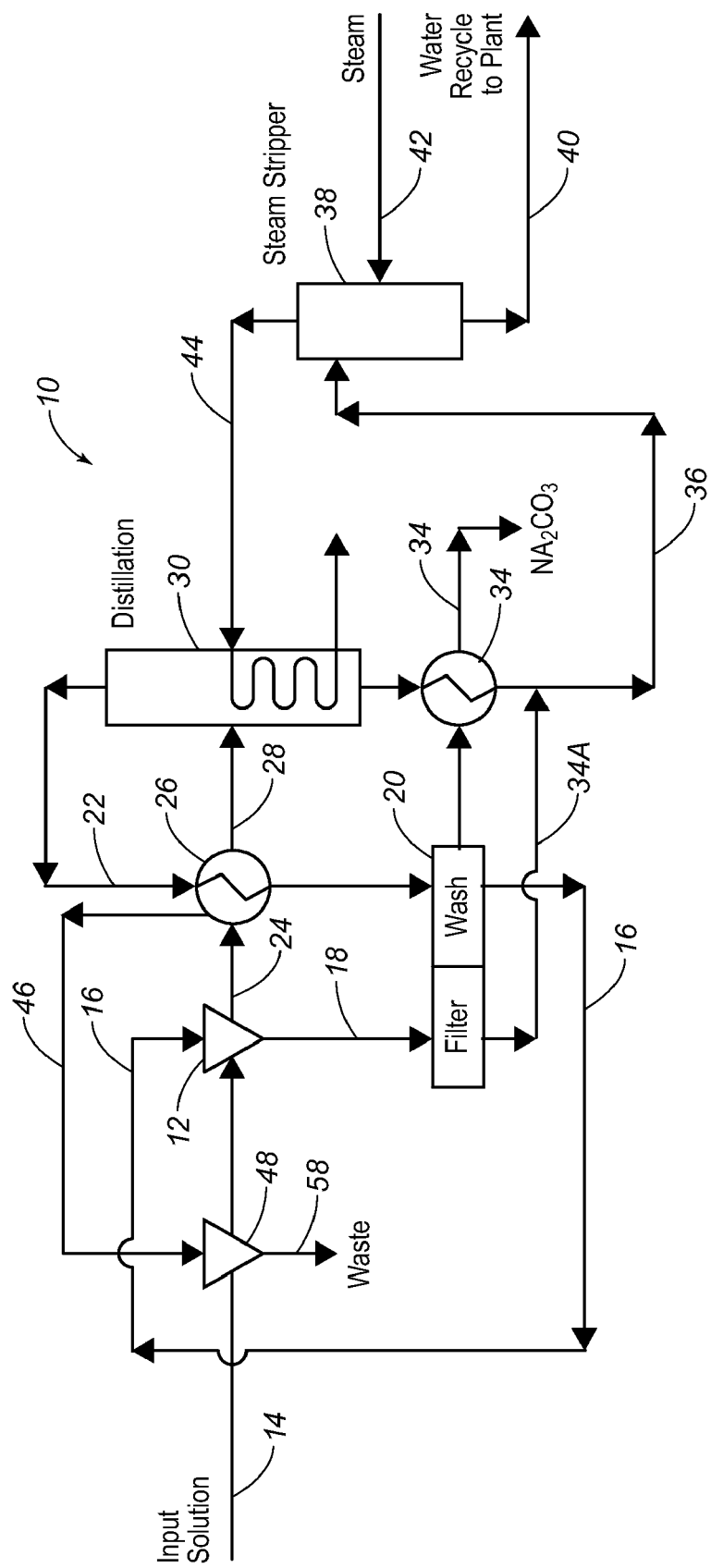
FIG. 1 is a block diagram showing the process of the present invention in its simplest form.

Referring to FIG. 1, there is shown at 10 a block diagram showing the simplest form of the process of the present invention. The process 10 of the present invention essentially involves the passing of an input solution at line 14 through a process to precipitate sodium carbonate crystals at line 34. As used herein, the "input solution" can be comprised of calcined-sodium carbonate, tailing pond water, waste pond water, sesquicarbonate or uncalcined trona or various mixtures of carbonates and bicarbonates. The flow of the input solution will first pass along line 14.

When the input solution passes to a crystallizer 48, methanol is added to the input solution so as to precipitate impurities containing calcium and magnesium. In particularly, these impurities include dolomite, shorite and other calcium compounds. The amount of methanol is controlled so as to keep sodium carbonate in the liquid form, while other inorganic molecules are crystallized out of the input solution. Methanol enters the crystallizer 48 through line 46, and the precipitated impurities are filtered as solids through the crystallizer 48 at line 58 as waste. The flow of the input solution, without the calcium and magnesium compounds, continues to pass along line 14 to a precipitator 12.

When the input solution is in the precipitator 12, methanol is added to the solution in the precipitator 12 so as to precipitate carbonate (the term "carbonate" is applicable to general sodium carbonate forms, like sodium bicarbonate, sodium carbonate, sodium sesquicarbonate and mixtures thereof), from the input solution. The methanol enters the precipitator 12 along line 16. The precipitated carbonate and methanol is passed along line 18 to the filter and washer 20. The precipitated carbonate is washed in the filter and washer 20 with a new methanol-containing solution. This methanol-containing solution is passed along line 22 to the filter and washer 20. The result of the washing process will cause the excess methanol from the precipitator 12 to be removed from the precipitated carbonate crystals, and this methanol removal wash passes outwardly of washer 20 along line 16 to be recycled back into the system. The amount of methanol from the methanol removal wash is adjusted so as to prevent further precipitation of remaining sodium carbonate in the original input solution, if any.

The input solution is separated from the precipitated carbonate crystals in the filter, such that the remaining liquid, without sodium carbonate compounds, passes along line 34A and line 36 to a steam stripper 38 for recycling. Also, any remaining methanol, cycled through line 16 of the precipitation process or received from the filter and wash 20, is passed along line 24 through valve 26 and outwardly therefrom along line 28 to the distiller 30. The distiller 30 will recycle the methanol by heating the methanol to a temperature in which the precipitated carbonate and methanol are separated. The distilled methanol passes along line 22, through valve 26, and to the filter and washer 20 for re-use in the process 10.

When the precipitated carbonate crystals have been washed, the crystals are passed to a dryer 32 along line 34. The dryer 32 will impart heat to the crystals so that either carbonate crystals or bicarbonate crystals (with a carbon dioxide atmosphere) can be formed. These crystals are further passed outwardly along line 34 for storage exterior of the system. The heating process in the dryer 32 will cause the evaporation and heating of the water within the crystals and break hydrates in the crystals if an anhydrous form is desired. This evaporated water is combined into line 36 for use as part of the steam stripper 38. Line 36 passes water and contains some alcohol. Line 34A also passes water to the steam stripper 38. The steam stripper 38 will facilitate the ability to recycle the water, along line 40, back to the plant. Steam is introduced to the steam stripper 38 along line 42. The steam output of the steam stripper 38 is passed along line 44 for use in the distiller 30. The output steam of the steam stripper 30 can also serve to strip the carbon dioxide.

The input solution along original line 14 can originate from natural trona that has been calcined prior to dissolving the ore (such as is used in the monohydrate process) or natural trona that is dissolved before calcining (such as used in the sesquicarbonate process or in solution mining). In the process 10 of the present invention, the addition of the methanol 46 to the aqueous input solution 14 of calcined or uncalcined trona ore in the crystallizer 48 serves to crystallize and allow for separation of impurities before a different addition of methanol is used to precipitate the carbonate or carbonated bicarbonate crystals. The resulting impurity crystals can be separated by filtration, centrifugation or vibrating screen. The impurity crystals may also be washed in a filter/washer using a methanol-containing solution as a methanol removal wash, to remove excess methanol on the impurity crystals. The impurity crystals can also be dried in a dryer, and the methanol used to crystallize the impurities may be recovered for reuse by passing through the distiller. For efficiency, the crystallizer 48 may pass the impurity crystals and input solution into filter and wash 20 and drier 32 such that the impurity crystals are separated similar to the process of precipitating and washing the desired sodium carbonate crystals.

In the process 10, the size, shape and distribution of the crystals can be controlled by the rate of addition of methanol as well as the volume percent of methanol 16 used in the precipitation step in the precipitator 12. The crystal density also affects the required concentration of methanol used in the methanol removal wash of the filter and wash 20. The crystals produced by this process 10 show considerably less variation in size than crystals produced by the current monohydrate or sesquicarbonate processes.

The process 10 can use trona to precipitate as sesquicarbonate without bicarbonate forming. With methanol the sesquicarbonate crystals are produced without additional alkalinity. X-ray diffraction analyses indicate only a small amount of sodium carbonate is present with the sesquicarbonate and no bicarbonate. The conversion of bicarbonate to carbonate in the original methanol precipitation depends upon the time of contact. The sesquicarbonate crystals are smaller crystals. In normal operation bicarbonate would be precipitated prior to getting a sesquicarbonate, without adding alkalinity.

The process 10 of the present invention can be used on solutions of sodium carbonate over a concentration range of about 120 grams/liter to saturation. Depending on the size of crystals desired, methanol can be added so as to produce a final solution concentration range (a resultant liquor) of about 15 volume percent to about 70 volume percent of methanol. The average crystal size will vary as a function of the volume percent methanol that is added plus the rate of methanol addition (residence time). In the present invention, the residence time can be between 10 and 100 minutes. The residence time of the methanol with the input solution in the precipitator will affect crystal size (to be described hereinafter).

Depending on the desired crystal density, the crystals can be washed in the filter/washer 20 in methanol-containing solutions ranging from about 50 volume percent to 100 volume percent. The average crystal density will be a function of the volume percent of methanol in the crystal wash solution entering the filter/washer 20 through line 22. In the step of washing, other alcohols, such as ethanol, propanol, butanol and acetone, may be used; however, methanol is preferred because of the ease and efficiency of recycling the methanol throughout the process.

For sesquicarbonate crystals, when sesquicarbonate is washed with 50 to 100 volume percent methanol, sesquicarbonate converts to thermonatrite (monohydrate). This wash to precipitate the sesquicarbonate was performed at 0.15 gallons/pound crystals. After the completed process of washing and drying to form sesquicarbonate, the sesquicarbonate appears to form both anhydrous sodium carbonate and wegschiederite ($Na_2CO_3 \cdot 3NaHCO_3$). By increasing the drying time or temperature, the wegschiederite may be expected to convert to anhydrous sodium carbonate. Process 10 of the present invention controls the need for conversion to anhydrous sodium carbonate. The methanol removal wash solution in the step prior to drying effects the density of the crystals to control the percentage of change from sesquicarbonate to anhydrous sodium carbonate and wegschiederite. For dense crystals a 50/50 volume percent methanol removal wash is used (See FIG. 3), and for light density crystals or light ash, a 100 volume percent wash is used (See FIG. 2). Once density is set, other washes do not appear to affect density.

Sesquicarbonate crystals generated by the process of the present invention can be converted to anhydrous crystals at significantly lower temperatures than crystals generated by the sesquicarbonate process.

For sodium carbonate crystals, the process 10 of the present invention may precipitate the trona into soda ash, also known as sodium carbonate. Depending upon the speed of addition of the methanol during the original precipitation, the size of the crystals can be controlled. In addition, the process 10, when washing crystals in 100 volume percent methanol or 50/50 volume percent methanol in a methanol removal wash, may control the density of the crystals. Thus, tailor grade soda ash can be produced with controlled crystal size distribution and crystal density to some extent.

Furthermore, in the process 10 of the present invention, the precipitation step is carried out at considerably lower temperatures than the evaporation process. As such, the overall energy cost to the system is reduced. The dryer 32 serves to dry the washed precipitated carbonates. The dryer 32 should apply temperatures of no less than 120° F. to the washed precipitated carbonate therein. As pure bicarbonate passes to the dryer 32, and if it is desired to have a bicarbonate output of the dryer 32 when precipitating a pure bicarbonate solution, then the temperatures, which are applied, should be less than 150° F. and the atmosphere within the dryer should be a vacuum or, at most, atmospheric pressure. Alternatively, if a bicarbonate crystal is desired from a mixture of pure carbonate, then the atmosphere within the dryer 32 must be a carbon dioxide atmosphere. Sesquicarbonate can be formed directly from trona precipitation. Either bicarbonate or carbonate can be formed from the sesquicarbonate, depending upon the dryer process employed. For anhydrous carbonate, a drying temperature of 228° F./109° C. is required at one atmosphere of pressure.

Another aspect of the present invention shows that, in the process 10 of the present invention, the methanol/water mixture is continually recycled throughout the system. As can be seen, after the methanol is properly reacted with the input solution in the precipitator 12, the used methanol is passed to the distiller 30. The methanol used in the crystallizer 48 to remove the calcium and magnesium impurities is also recycled through line 46 and as line 14 continues through to the precipitator 12. The methanol removal wash 22 recycles methanol through lines 16 and 24. The distiller 30 will then distill the water from the methanol such that the methanol can be recycled for use in the other stages of the process, including the original precipitation of the crystals. The mixture of water and methanol can be controlled throughout the process 10 so as to control crystal density, crystal size, crystal size distribution and crystal morphology in the precipitator 12 and so as to adjust the volume percent of the methanol in the crystallizer 48 and methanol removal wash 22 for the desired crystallizing and washing effects.

Figure 2:
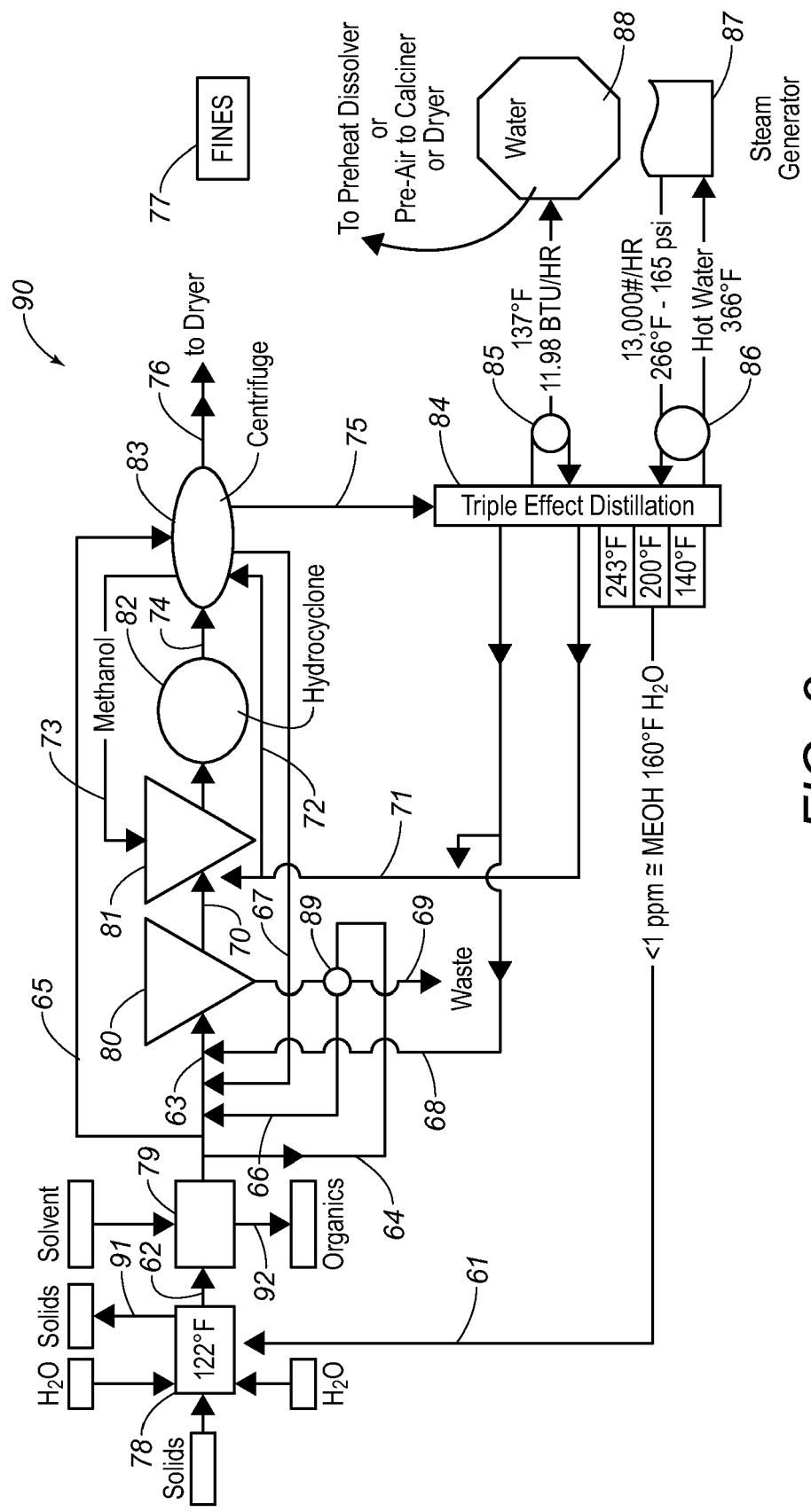
FIG. 2 is a block diagram showing a preferred embodiment of the present invention for production of low density sodium carbonate crystals.

FIG. 2 shows a preferred embodiment of the present invention for precipitation of low density crystals or lite ash through process 90. Input solution, containing sodium carbonate, is first produced in dissolver 78. As indicated in FIG. 2, solids are added into the dissolver 78 along with water. The solids may include uncalcined trona, calcined trona or other raw compounds containing sodium carbonate including sesquicarbonate. Additionally, the water is added into the dissolver and maintained at 122° F. as indicated in order to dissolve as much solids as possible. Water may also be added through line 61 from the triple affect distillation of the process 90. In the dissolver 78, the input solution becomes a liquid, and undissolved particles may be easily filtered out and removed from the dissolver 78 as indicated through line 91. Input solution is then moved along line 62 to the organic wash station 79. In the organic wash station 79, a solvent is added in an attempt to separate organic impurities from the input solution. Known methods and solvent to remove dissolved organic impurities are used and isolated from the input solution through line 92.

Along line 63, the input solution proceeds to the crystallizer 80. Methanol is added to the input solution to crystallize the calcium and magnesium impurities, such as dolomite, through line 68 in the crystallizer 80. Line 68 supplies water and methanol from a triple effect distillation device 84. By controlling the methanol concentration, only the calcium and magnesium impurities are crystallized out of the input solution. Such impurities are passed through a washing station 89 and proceed along line 69 as dolomite waste. The input solution, without the calcium and magnesium impurities, like dolomite, continue along line 70 towards a precipitator 81.

Before reaching the crystallizer 80, the input solution is set along line 64 to the washing station 89. The input solution washes previously crystallized hardness impurities and returns to the crystallizer 80 on line 66. From line 66 and the washing station 89, the input solution has recycled residual methanol from the previous crystallization of dolomite. Also before reaching the crystallizer 80, the input solution is set along line 65 to a centrifuge 83. The input solution is passed through the centrifuge 83 and returned to the crystallizer 80 on line 67. This step recycles residual methanol remaining in the centrifuge 83 from previous use. The preferred embodiment of the present invention in process 90 increases efficiency by reuse of materials throughout the system, as shown in the recycling streams through lines 64 and 66 and line 65 and 67.

The input solution, without the calcium and magnesium impurities, enters the precipitator 81 to precipitate the desired sodium carbonate crystals. By controlling addition of methanol through lines 71 and 73 in the precipitator 81, the sodium carbonate crystals will be precipitated according to the desired density and size as determined by the user. Water, in addition to methanol, may be supplied to the precipitator on line 71 from the triple effect distillation device 84. The sodium carbonate crystals are formed in the precipitator 81. To separate the solid carbonate crystals from the input solution, the mixture is transferred to hydrocyclone 82 and then to centrifuge 83 along line 74. The input solution, now devoid of dissolved sodium carbonate, is filtered through the centrifuge 83 as recyclable water and methanol. The separated liquid is passed through line 75 to the triple effect distillation device 84.

The sodium carbonate crystals in the centrifuge 83 have residual methanol. A methanol removal wash is performed by washing the crystals with 100 volume percent methanol for the low density crystals to become lite ash. The methanol enters the centrifuge 83 through line 72 and removes the excess methanol on the crystals. The methanol solution is now recycled back into the process of the present invention through line 73 for supplying methanol for a later precipitation in the precipitator 81. Lines 72 and 73 represent another recycling stream for the efficiency of the present invention.

After the methanol removal wash, the precipitated and washed crystals are moved along line 76 to be sent to the dryer. The dryer may reduce the crystals into more anhydrous forms and fines 77 of lite soda ash.

In the triple affect distillation device 84, the discarded input solution of water and methanol may be distilled into separate components for recycling back into the process 90 of the present invention. Methanol may be distilled and sent recycled back into the process via line 68 for the crystallization of the calcium and magnesium impurities in the crystallizer 80. Alternatively, water and methanol may be heated to 137° F. so as to preheat the water to a dissolver. This process will only remove a portion of the methanol from the water. A controlled volume percent of methanol and water may be produced and sent via line 71 into the precipitator 81 for the precipitation of the sodium carbonate crystals. Still further, the triple affect distillation device 84 may heat the water to a point that steam is generated to steam generator 87. At this point, the condensed water will be considered having less than one part per million of methanol, and this water may be re-used in the dissolver 78 via line 71 for the initial dissolving of trona and production of the original input solution.

In the present invention, various methods of reducing impurities has been applied. The input solution has been processed for solid impurities and organic impurities. The present invention offers the new means of reducing hardness impurities. The crystallizer 80 removes such calcium and magnesium compounds using previously disclosed techniques to crystallize the calcium and magnesium compounds from solution as solid crystals. Using a methanol solution of approximately 10 volume percent, the calcium and magnesium compounds are precipitated out of the input solution before the precipitation of the sodium carbonate crystals. As previously disclosed, the sodium carbonate precipitation requires a higher percentage of methanol in order to start a carbonate crystal formation. The present invention proposes the precipitation of different compounds using a lower concentration of methanol, which can be recycled and increase the efficiency of the process of the present invention.

Also in the present invention, the processes proposes a methanol removal wash in the centrifuge 83. Using recycled methanol, at a lower concentration than precipitation, the sodium carbonate crystals are washed so as to remove excess methanol. The excess methanol originated from original precipitation of the crystals. Removing the excess methanol reduces the amount of heat necessary to dry the crystals. This inventive aspect increases the heat efficiency and overall efficiency of the production of sodium carbonate crystals.

Figure 3:
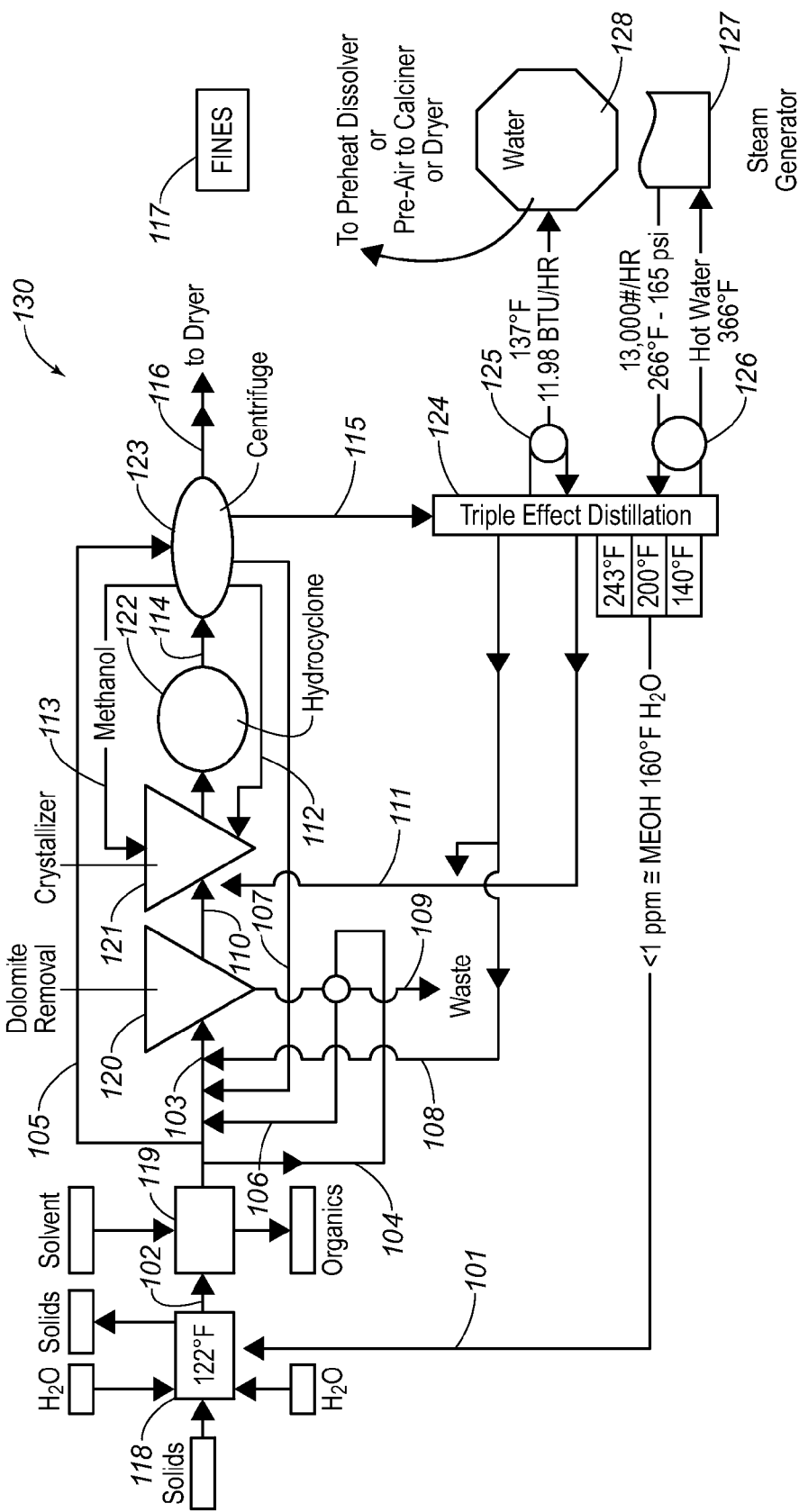
FIG. 3 is a block diagram showing a preferred embodiment of the present invention for production of high density sodium carbonate crystals.

FIG. 3 shows an alternative embodiment of the present invention for precipitation of high density crystals or heavy ash through process 130. Similar to FIG. 2, the input solution, containing sodium carbonate, is first produced in dissolver 118. The solids may include uncalcined trona, calcined trona or other raw compounds containing sodium carbonate including sesquicarbonate. Additionally, the water is added into the dissolver 118 and maintained at 122° F. as indicated in order to dissolve as much solids as possible. Water may also be added through line 101 from the triple effect distillation device 124 of the process 130. In the dissolver 118, the input solution becomes a liquid, and undissolved particles may be easily filtered out and removed from the dissolver 118 as solids. The input solution then moves along line 102 to the organic wash station 119, where organic solvent is added to separate organic impurities from the input solution. Known methods and solvent to remove dissolved organic impurities are used and isolated from the input solution.

Along line 103, the input solution proceeds to a crystallizer 120. Methanol is added to the input solution to crystallize the calcium and magnesium impurities, such as dolomite, through line 108 in the crystallizer 120. Line 108 supplies water and methanol from a triple effect distillation device 124. By controlling the methanol concentration, only the calcium and magnesium impurities are crystallized out of the input solution. Such impurities are passed through a washing station and proceed along line 109 as dolomite waste. The input solution, without the calcium and magnesium impurities, continues along line 110 towards a precipitator 121.

Before reaching the crystallizer 120, the process 130 of FIG. 3 incorporates the recycling as shown in FIG. 2. The input solution is set along line 104 to the washing station to wash previously crystallized hardness impurities and returns to the crystallizer 120 on line 106. Also before reaching the crystallizer 120, the input solution is set along line 105 to a centrifuge 123 and returned to the crystallizer 120 on line 107. This step recycles residual methanol remaining in the centrifuge 123 from previous use. This alternative embodiment of the present invention in process 130 increases efficiency by reuse of materials throughout the system, as shown in the recycling streams through lines 104 and 106 and line 105 and 107.

The input solution, without the calcium and magnesium impurities, enters the precipitator 121 to precipitate the desired sodium carbonate crystals. By controlling addition of methanol through lines 111 and 112 in the precipitator 121, the sodium carbonate crystals will be precipitated according to the desired density and size as determined by the user. Water, in addition to methanol, may be supplied to the precipitator on line 111 from the triple effect distillation device 124. The sodium carbonate crystals are formed in the precipitator 121. To separate the solid carbonate crystals from the input solution, the mixture is transferred to hydrocyclone 122 and centrifuge 123 along line 114. The input solution, now devoid of dissolved sodium carbonate, is filtered through the centrifuge 123 as recyclable water and methanol. The separated liquid is passed through line 115 to the triple effect distillation device 124.

The sodium carbonate crystals in the centrifuge 123 have residual methanol. A methanol removal wash is performed by washing the crystals with 50 volume percent methanol for the high density crystals to become heavy soda ash. The methanol at 50 volume percent enters the centrifuge 123 through line 113 and removes the excess methanol on the crystals. The methanol solution is now recycled back into the process of the present invention through line 112 for supplying methanol for a later precipitation in the precipitator 121. Importantly, the process 130 in FIG. 3 differs in the recycling stream between lines 112 and 113. The 50 volume percent mixture for the methanol removal wash starts from the precipitator 121, unlike the 100 volume percent originating from the triple effect distillation device for low density crystals. However, the process 130 maintains efficiency by recycling the 50 volume percent methanol back to the precipitation of sodium carbonate crystals in the precipitator 121.

After the methanol removal wash, the precipitated and washed crystals are moved along line 116 to be sent to the dryer and eventual processing into more anhydrous forms and fines 117 of heavy soda ash.

The foregoing disclosure and description of the invention is illustrative and explanatory thereof. Various changes in the details of the described method may be made within the scope of the appended claims without departing from the true spirit of the invention. The present invention should only be limited by the following claims and their legal equivalents.

I claim:

1. A method of producing sodium carbonate crystals from a sodium carbonate-containing input solution comprising the steps of:
    introducing the sodium carbonate-containing input solution to a crystallizer, the sodium carbonate-containing input solution having a sodium carbonate concentration ranging from 100 g/l to saturation;
    mixing methanol with the sodium carbonate-containing input solution in the crystallizer such that a crystallizing solution has methanol in a concentration of between 1% and 10% by volume;
    precipitating solid calcium and magnesium compounds from the crystallizing solution;
    filtering the solid calcium and magnesium compounds from the crystallizing solution;
    passing the crystallizing solution to a precipitator after said step of filtering;
    adding methanol to the crystallizing solution in the precipitator such that a resultant liquor has methanol in a concentration of between 15% and less than 70% by volume, said methanol being in residence with said sodium carbonate-containing solution for between 10 and 100 minutes; and
    precipitating sodium-carbonate crystals from the resultant liquor.

2. The method of claim 1, further comprising:
    washing the precipitated sodium-carbonate crystals with a methanol-containing solution; and
    drying the washed-precipitated sodium-carbonate crystals.

3. The method of claim 2, said methanol-containing solution having a methanol concentration of 50% volume percent so as to precipitate high density sodium carbonate crystals.

4. The method of claim 2, said methanol-containing solution having a methanol concentration of 100% volume percent so as to precipitate low density sodium carbonate crystals.

5. The method of claim 2, said methanol-containing solution having a methanol concentration ranging between 50% and 100% by volume.

6. The method of claim 1, said sodium carbonate-containing input solution having a calcium and magnesium impurity concentration ranging from 30 g/l to saturation.

7. The method of claim 1, further comprising the step of:
    washing the solid calcium and magnesium compounds with a methanol-containing solution before said step of filtering.

8. The method of claim 1, said sodium carbonate-containing input solution having a concentration of sodium carbonate ranging from 300 g/l at 82° C. to saturation, said resultant liquor having a methanol concentration of between 30% and 70% by volume.

9. The method of claim 8, said resultant liquor having a methanol concentration of between 40% and 60% by volume.

10. The method of claim 1, said sodium carbonate-containing input solution being tailing pond water having a sodium carbonate concentration ranging between 135 g/l and 380 g/l, said sodium carbonate-containing solution having a sulfate ion content of between 2 g/l and 5 g/l, said resultant liquor having methanol in a concentration ranging between 40% and 50% by volume.

11. A method of producing sodium carbonate crystals from a sodium carbonate-containing solution comprising the steps of:
    centrifuging the sodium carbonate-containing input solution;

introducing the sodium carbonate-containing input solution to a crystallizer;

mixing methanol with the sodium carbonate-containing input solution in the crystallizer such that a crystallizing solution has methanol in a concentration of between 1% and 10% by volume;

precipitating solid calcium and magnesium compounds from the crystallizing solution;

filtering the solid calcium and magnesium compounds from the crystallizing solution;

passing the crystallizing solution to a precipitator after said step of filtering;

adding methanol to the crystallizing solution in the precipitator such that a resultant liquor has methanol in a concentration of between 15% and less than 70% by volume;

precipitating sodium-carbonate crystals from the resultant liquor;

sending the resultant liquor to a hydrocyclone after the step of precipitating sodium-carbonate crystals; and centrifuging the resultant liquor after the step of sending.

12. The method of claim 11, further comprising:

washing the precipitated sodium carbonate crystals with a methanol-containing solution;

removing bulk water and methanol from said precipitated sodium carbonate crystals; and drying the washed precipitated sodium carbonate crystals.

13. The process of claim 12, wherein said step of removing bulk water and methanol comprises washing said crystals at 0.2 gallons/pound of solids on a vacuum filter.

14. The process of claim 12, wherein said step of removing bulk water and methanol is performed on filter paper with agitation.

15. The process of claim 12, wherein said step of washing the precipitated sodium carbonate crystals uses a 50% by volume solution of methanol and water as a removal wash, such that the concentration of the solution and crystals does not exceed 30% methanol by volume.

16. The process of claim 12, wherein said step of washing the precipitated sodium carbonate crystals uses a 100 volume percent solution of methanol as a removal wash, such that the concentration of the solution and crystals does not exceed 30% methanol by volume.

17. The method of claim 11, the sodium carbonate-containing input solution having a sodium carbonate concentration ranging from 100 g/l to saturation, said methanol being in residence with said sodium carbonate-containing solution for between 10 and 100 minutes.

* * * * *